(12) United States Patent
Bünger et al.

(10) Patent No.: US 11,582,274 B2
(45) Date of Patent: Feb. 14, 2023

(54) VIDEOCONFERENCING SYSTEM

(71) Applicant: Trustybell GmbH, Graefelfing (DE)

(72) Inventors: Constantin Eberhard Bünger, Raunheim (DE); Wilfried Schaffner, Vienna (AT)

(73) Assignee: Trustybell GmbH, Graefelfing (DE)

( * ) Notice: Subject to any disclaimer, the term of this patent is extended or adjusted under 35 U.S.C. 154(b) by 0 days.

(21) Appl. No.: 17/522,354

(22) Filed: Nov. 9, 2021

(65) Prior Publication Data

US 2022/0150286 A1 May 12, 2022

(30) Foreign Application Priority Data

Nov. 10, 2020 (EP) .................................... 20206720

(51) Int. Cl.
*H04L 65/403* (2022.01)
*G06V 40/16* (2022.01)
*G06F 21/32* (2013.01)

(52) U.S. Cl.
CPC ............ *H04L 65/403* (2013.01); *G06F 21/32* (2013.01); *G06V 40/172* (2022.01)

(58) Field of Classification Search
USPC ...................................................... 348/14.07
See application file for complete search history.

(56) References Cited

U.S. PATENT DOCUMENTS

| 9,007,420 B1* | 4/2015 | Passe | H04M 3/42102 |
| | | | 379/142.05 |
| 10,452,897 B1* | 10/2019 | Benkreira | G06V 40/168 |
| 2007/0188596 A1* | 8/2007 | Kenoyer | H04L 65/4046 |
| | | | 348/E7.084 |
| 2007/0188598 A1 | 8/2007 | Kenoyer | |

FOREIGN PATENT DOCUMENTS

| CN | 110245481 A | 9/2019 |
| EP | 3575993 A1 | 12/2019 |
| WO | 2020051643 A1 | 3/2020 |

* cited by examiner

*Primary Examiner* — Amal S Zenati
(74) *Attorney, Agent, or Firm* — The Webb Law Firm (57) ABSTRACT

The present invention relates to a method for conducting a videoconference including a certified verification of at least one communication partner (first participant). Thus, another communication partner (second participant) is provided with legal certainty that the person whom he or she talks to is indeed the person she says she is. For this purpose, on the side of the first participant a technical verification step is performed in advance of setting up the video call, which is based at least on a comparison of an image of the first participant captured in real-time and an image available on an official document such as an ID card of the first participant. In case of success, respective verified identification information of the first participant is transmitted to the terminal equipment of the second participant and indicated to the second participant.

14 Claims, 7 Drawing Sheets

VIDEOCONFERENCING SYSTEM

CROSS-REFERENCE TO RELATED APPLICATIONS

This application claims priority to European Patent Application No. 20206720.3 filed Nov. 10, 2020, the disclosure of which is hereby incorporated by reference in its entirety.

BACKGROUND OF THE INVENTION

Field of the Invention

The present invention relates to systems and methods for setting up and conducting videoconferences. More specifically, the present invention relates to videoconferencing systems and methods that are capable of a certified identification of at least one participant of a video conference to one or more other participants of the video conference.

Description of Related Art

In recent years, videoconferences have become a popular means for providing meetings and discussions of various types between people situated at different locations, remote from each other. Videoconferences are particularly popular in situations, where it is not possible, not desirable or too expensive or too difficult to conduct the meeting in person, by travelling and gathering at a particular common location.

Situations, in which videoconferences (video calls) may be performed may include situations, where it is essential, for at least one participant of the videoconference, to have legal security about the identity of another participant. This may include, for instance, various situations of e-governance, such as conducting appointments of citizens before government or local authorities.

While means for digitally signing official documents have become known in the art, conventional videoconferencing applications do not allow verifying the true identity of a conversation partner (participant of a videoconference) in a trustworthy manner, which has the disadvantage that it does not allow conducting appointments by means of videoconferencing, where a certified verification of the identity of a participant is indispensable, with the same legal security as if they were in the same room.

SUMMARY OF THE INVENTION

The present disclosure aims to address the above identified drawback and to provide a method for conducting a videoconference that enables a verified identification of one or more participants to at least one other participant.

This is achieved by the disclosure herein.

According to a first aspect of the present disclosure, a method of conducting a video or telephone call between at least two participants is provided. The method comprises the steps of verifying the identity of the first participant and, after successful verification of the identity of the first participant, providing information indicating the verified identity of the first participant to a second participant before and during the video or telephone call. The step of verifying the identity of the first participant comprises the steps of capturing a face image of the first participant, as a first image, and of capturing an image of an official document identifying the first participant, as a second image. The official document includes a face image of the first participant, together with further data identifying the first participant. The two images are captured immediately before the setup of the video or telephone call. The step of verifying the identity of the first participant further comprises the step of verifying the identity at least by comparing the first image with the face image included in the second image, by means of technical image analysis. The step of providing information comprises the steps of generating a signal including verified data identifying the first participant on the basis of data extracted from the second image, transmitting the signal to the site of the second participant, and displaying the verified data identifying the first participant on a terminal device of the second participant used for conducting the video or telephone call.

According to a second aspect of the present disclosure, a system for conducting a video or telephone call between at least two participants is provided. The system comprises terminal equipment of a first participant and terminal equipment of a second participant. The system comprises equipment for verifying the identity of the first participant. The system is further adapted to provide information indicating the verified identity of the first participant to the second participant before and during the video or telephone call, after successful verification of the identity of the first participant. The equipment for verifying the identity of the first participant comprises a first camera for capturing, immediately before setup of a video or telephone call, a face image of the first participant, as a first image and a second camera for capturing, immediately before the setup of the video or telephone call, an image of an official document identifying the first participant, as a second image. The equipment for verifying the identity of the first participant further comprises a processor for comparing the first image with the face image included in the second image, by means of technical image analysis, and a signal generator for generating a signal including verified data identifying the first participant on the basis of data extracted from the second image. The terminal equipment of the first participant comprises a transmitter for transmitting the signal to the terminal equipment of the second participant. The terminal equipment of the second participant comprises a display for displaying the verified data identifying the first participant.

It is the particular approach of the present disclosure to conduct a videoconference (video call) so that at least one participant is able to provide her or his identity to another participant, in a verified manner. For this purpose, a step of technical verification of the identity of a participant and the setup of a videoconference are combined. More specifically, the identity of the first participant is verified by technical means in advance of the setup of the videoconference and, in case of successful verification, verified data identifying the first participant are transmitted and provided to at least one second participant before and during the videoconference. In a case when no successful verification of the identity was possible, set up of the videoconference may be rejected. The technical verification is based on image analysis and includes comparison of at least an image of the first participant captured in real time, before setup of the video call and an image included in an official document of the first participant, such as an ID card, and extracting further personal data from the official document. Thereby, the same level of trustworthiness is achieved as if the meeting was conducted at a common location, and the first participant would identify herself or himself before the second participant with the ID card.

Although the description herein below set forth basically for conducting videoconferences (video calls), the invention is equally applicable to speech only telephone calls, as long as the terminal equipment allows for capturing images, on the one side, and displaying the verified identity data, on the other side. This may, for example, be the case for telephone calls between two smartphones.

In embodiments, the first image and the second image are captured by the same camera. Alternatively, different cameras may be used for capturing the first and the second image. It must, however, be ensured that the camera or cameras are so linked to the terminal equipment of the first participant with which the video call is to be set up that no manipulation in the process of capturing the images and performing the verification based thereon is possible. More specifically, therefore the one or two cameras may be included in a terminal device of the first participant used for conducting the video or telephone call. For instance, this may be one or more cameras included in or attached to a computing device used for videoconferencing, such as a laptop, or a smartphone. For trustworthiness of the identification, it is further necessary that the images are taken in close temporal proximity, immediately in advance of the initiation of the setup, in order to guarantee that the person initiating and conducting the video call is indeed present at the respective terminal equipment at this particular time. This may, in particular, be the case if a difference in time between capturing each of the images, and initiating the call setup does not exceed a predetermined time, when measured by a common timer. As a further means of verification, taking the second image may include taking an image of the official document in front of the face of the first participant, i.e. the person identified by the official document, as a background, so as to verify the presence of the person identified by the document at the given instance of time.

According to embodiments, a series of first images and/or a series of second images may be captured. The individual images of the series of first images may differ from each other by different orientations of the face of the first participant. Specifically, the first participant may turn the head left and right, while a series of first images is captured. The individual images of the series of second images may differ from each other by a different tilt of the official document. This enables to render security identifiers such as watermarks visible. Thus, using a series of first and/or second images (short video or "movie" sequences) in the verification of the identity may increase security.

According to embodiments, the verifying step may further comprise the step of comparing data extracted from the official document captured in the second image with data pre-stored in a database. For instance, in a database associated with the terminal equipment used by the first participant, there may be a list including a plurality of predetermined persons which are entrusted to use the terminal equipment to conduct videoconferences with verified identification. The names of the persons included in the list ("trusted persons") may be stored in correspondence with further data that can be extracted from the official document available in real-time, such as address, place of birth, kind and number of the official document. In this case, the identity of the first participant will be verified only if data corresponding to those stored in the database in correspondence with the name of the trusted person can be extracted from the second image of the document captured in real-time. The database may be included in the terminal equipment used by the first participant itself or in another device, located in close proximity or remotely from the terminal equipment and connected with the terminal equipment in a secure manner.

Also, the terminal equipment used by the first participant may additionally be able to determine a location of the first participant. This may, for instance, be the case by employing satellite location, such as via GPS, or other means of location, including but not limited to locating a cell phone in a cellular phone network or at least approximately determining the location by means of an IP address used by the terminal equipment on the Internet. Thus determined location information of the first participant may then be transmitted to the site of the second participant. For reasons of data security, the first participant may be prompted to give her or his consent to the transmission of the location data, before the transmission starts. The transmitted location information, after having been received at the site of the second participant, will then be indicated to the second participant. This verifies that a person is indeed at a location where he or she claims to be or is presumed to be.

According to embodiments, the verified data included in the signal transmitted to the second participant and displayed on the terminal device of the second participant may include at least the name of the first participant. In embodiments, the verified data may include further information, such as a first name, kind and number of the official document, address, date of birth, place of birth, without being limited to these. In embodiments, this and other data, including the name, may be extracted from the official document presented by the first participant for being captured in the second image. Alternatively, at least a part of the data may be taken from a database, where they are stored in association with other data that allow for verification.

According to embodiments, the second image, i.e. the image of the official document is completely included in the signal transmitted to the side of the second participant and displayed to the second participant. This means that the second participant obtains a verified image of the official document identifying the first participant and captured in real time, as if the document would be presented to the second participant in person.

According to embodiments, the verified data identifying the first participant are transmitted to and indicated to the second participant, before setup of the video or telephone call is completed. Hence, the second participant may check the data provided to her or him, before the actual videoconference can start. In addition, the second participant may be invited to confirm call setup completion after having been provided with verified data so that the second participant still has the possibility to reject call setup in case the second participant still has any doubt regarding trustworthiness of the transmitted data.

According to embodiments, the verified data remain available to the second participant after the end of the video or telephone call. The second participant may then be able to register the data and/or collect the data in advance of an intended subsequent further call videoconference with the same first participant.

In accordance with embodiments, in case of a video call, the verified data are displayed in a dedicated portion of the screen used for the video call. This may be, in particular, a specific pop-up window (picture-in-picture, PIP) arranged in a specified portion of the screen, such as an upper left corner. The data may also be indicated in front of the video image, as an overlay image. Further, according to embodiments, in case of a video call, the step of verifying the identity of the first participant may be repeated during the course of the videoconference. After a successful repetition of the verification, a respective updated signal including updated verified identity data. For the repeated verification the first image is captured by the same video camera that is used for the video image to be transmitted to the second participant. In particular, the first image is extracted from the video image transmitted to the second participant. Thereby it can be ensured that the person who indeed conducts the videoconference remains the same the identity of whom was initially verified.

In embodiments, setup of the video or telephone call may be rejected, when the identity of the first participant could not be successfully verified. This might be the case if there are any inconsistencies, for instance, between the image data of the face image included in the official document and the face image presented for being captured in the first image in real-time, or in case of any inconsistency between data extracted from the official document and data pre-stored in a database entry corresponding to the person allegedly being the first participant. Also, no successful verification is possible in case of any inconsistencies with respect to security features of the official document, which may be revealed, for instance, when the first participant is requested to tilt the document in front of the camera. In this case, the videoconference can only be conducted if identity of the first participant was successfully verified.

In alternative embodiments, setup of the video telephone call may be completed even if the verification of the identity failed. In this case, an indication will be transmitted and provided to the second participant that the verification of the identity of the first participant failed. This gives the second participant the opportunity to nevertheless accept the videoconference call but be warned that the first participant is possibly not trustworthy, and no steps should be conducted or information be provided over this connection, for which a secure verification would be necessary. Further, in embodiments, verification of the identity may be performed in a bi-directional manner, i.e. the identities of the first participant and the second participant are mutually verified to each other. For this purpose, the terminal equipment on both sites is equipped to perform the functionality as terminal equipment of the first and second participant, respectively, according to the second aspect of the present invention described above, or any of the above identified embodiments.

Further features and advantages of the present invention are set forth in dependent claims. Combinations of individual features disclosed in the present specification and defined in dependent claims are possible in the framework of the present disclosure unless explicitly stated otherwise or it becomes clear for a skilled person form a particular context that a combination of particular features is not possible.

BRIEF DESCRIPTION OF THE DRAWINGS

Additional features and advantages of the present invention will become apparent in the following and more particular description as illustrated in the accompanying drawings, wherein.

DETAILED DESCRIPTION

The present invention relates to a system and method for conducting a video call with certified identification. The present invention renders it possible to talk to other people from any part of the world, including authorities, with providing the same legal security as if they were in the same room. Hence, travels and displacement can be avoided even when a secure identification is necessary.

Figure 1:
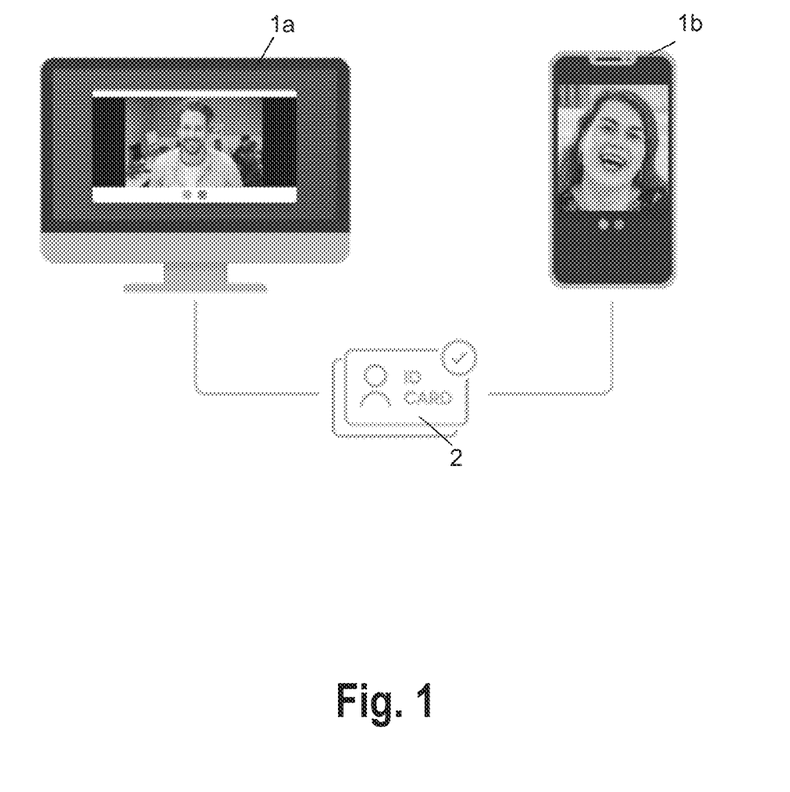
FIG. 1 provides a general overview of a system and method according to embodiments of the present invention.

An overview of the approach of the present invention is given in FIG. 1. Two pieces of terminal equipment, a laptop computer 1a and a smartphone 1b are connected so as to conduct a video call. In addition, the exchange of verified data is indicated by a schematic illustration of an ID card 2 of at least one of the participants conducting the videoconference.

The drawing of FIG. 1 does not show which of the pieces of terminal equipment is used by the person who has to verify her or his identity ("first participant") and which piece of equipment is used by the person who receives the verified identity information ("second participant"). It is worth noticing that the role of a participant does not depend on the used terminal equipment. A laptop and a smartphone are illustrated by way of example only and any suitable equipment including a smartphone, a laptop, a desktop computer or a professional video conferencing equipment can be used on either or both sides of the communication. As indicated above, the present invention also covers the case of a mutual, i.e. bi-directional verified identification of both participants with respect to each other. In this case, the ID card 2 symbolizes the respective verified data of both participants. In particular, the verified data includes a symbol (shown in the right upper corner) indicating the verification of the data.

Figure 2:
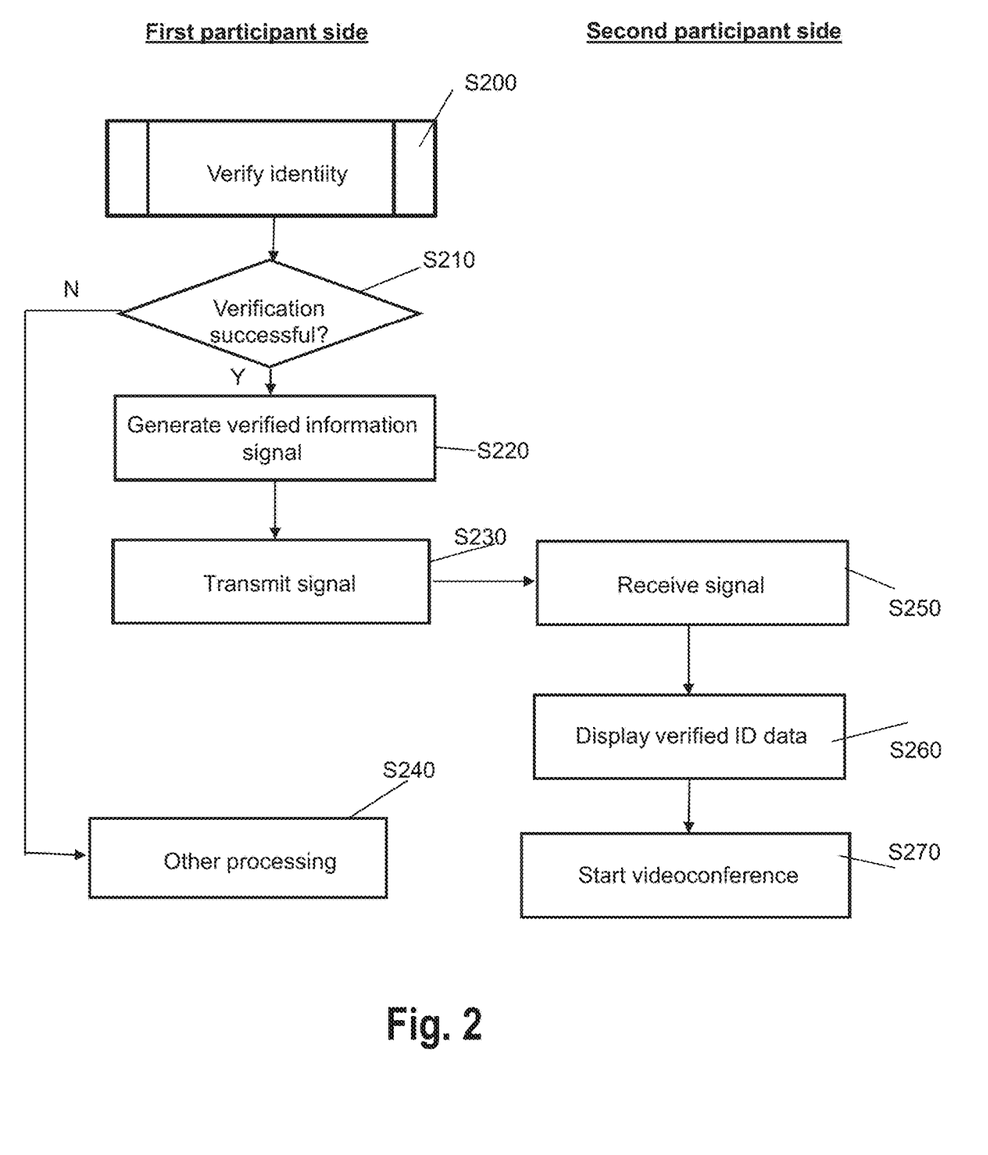
FIG. 2 is a flowchart giving an overview of the method steps performed by the terminal equipment of the first and the second participant of a telephone call or videoconference, in accordance with embodiments of the present invention.

FIG. 2 gives an overview of an overall workflow of a method according to the present invention. In initial step S200, the identity of the first participant is verified. Details about this step will be described further below with reference to FIG. 3.

In subsequent step S210 it is judged whether or not the verification of the first participant was successful. A successful verification includes, in particular, a secure determination of the identity of the person of the first participant. If no determination of the identity of the person who intends to be the first participant is possible, or if during the verification of the identity there were any inconsistencies that may give raise to doubt, the verification was unsuccessful.

In case of successful verification (S210: Y) the processing flow proceeds to step S220. In this step, a signal (data packet) is generated, for being transmitted to the side of the second participant, the signal including verified information about the identity of the first participant which was successfully determined in step S200. The verified information included in the signal may be extracted from the official document presented by the first participant for the verification. This information includes at least a name (last name) of the first participant but may include any further information that can be verified, for instance after having been extracted from the official document such as the ID card of the first participant. Such information may include but not be limited to a first name, date and place of birth, type and number of the official document, place and date of issuance of the official document, photograph of the holder of the official document (i.e. the first participant). The verified information in the signal may also include the captured image of the official document (second image) as a whole.

Extracting of data from the second image may be performed by any method a skilled person is aware of or will become aware of in the future, including but not limited to optical character recognition (OCR) for extracting information from text or image extraction and analysis applied to the image of the person included in the official document.

In the following step S230 the signal is transmitted from the site (terminal equipment) of the first participant to the site (terminal equipment) of the second participant. The signal is received at the site (terminal equipment) of the second participant in step S250.

Figure 7:
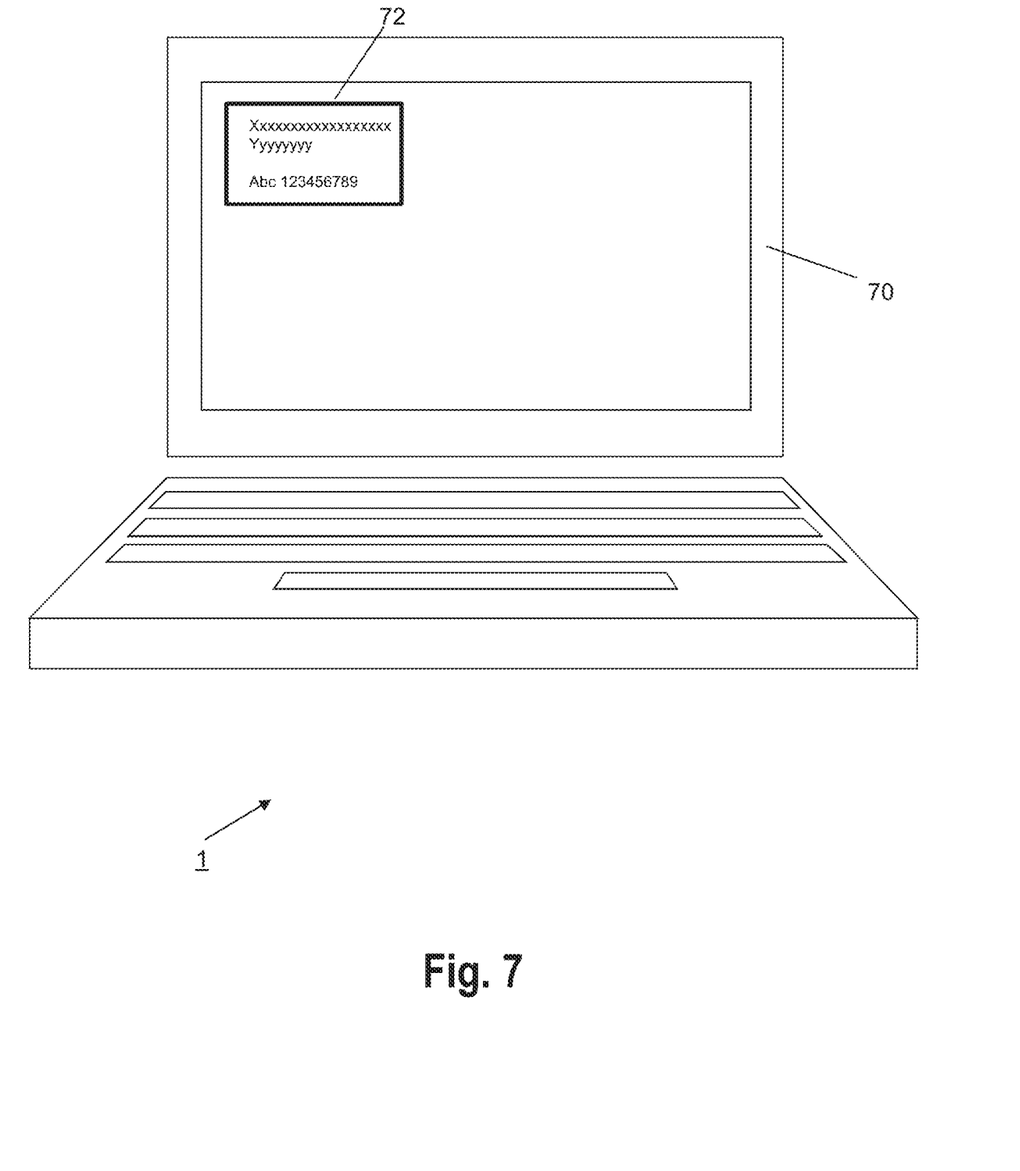
FIG. 7 illustrates an example of displaying verified identity information of the first participant on a video screen of a second participant, by means of a picture-in-picture window, according to embodiments of the present invention.

In subsequent step S260, the verified ID data included in the signal are indicated, in particular, displayed, to the second participant. It is important that the indication comprises a conformation of the fact that the identity of the communication partner (first participant) has been verified. Therefore, the verified identity data include a specific symbol or watermark confirming successful verification (such as the "check" symbol in the right upper corner of the ID card 2 symbolized in FIG. 2). Thereby, the second participant is given the opportunity to read the verified identity data, to print them out and to perform any possibly desired further analysis steps on his side before actually entering the videoconference. Subsequently, the setup of the videoconference (video or telephone call) may be completed and the videoconference starts in step S270. During the videoconference, the verified identity data remain indicated (displayed) to the second participant, for instance as an overlay to the main screen of the videoconference, or in a pop-up window, as illustrated in FIG. 7.

Details of setting up and starting the videoconference are not specific to the present invention and any respective method known to a skilled person may be used. Usually, any intended participant of a videoconference enters a virtual "waiting-room" at first, waiting for being admitted to the videoconference by a participant (organizer) who organizes the videoconference.

It is emphasized that the exact contents and sequence of the method steps is given here by way of illustrative example only and the present invention is not limited thereto. For instance, it is possible that the videoconference does not automatically start after transmission and display of the verified identity data of the first participant but the second participant is given a prompt to confirm conduct of the videoconference after having been provided with the verified identity data in step S260. The flow then proceeds to step S270 after confirmation by the second participant. Otherwise, conducting the videoconference is rejected and the setup procedure is cancelled. In alternative embodiments, the setup of the videoconference may be automatically completed with the transmission of the verified identity data.

If the verification of the first participant was not successful (S210: N), so that no verified information signal could be generated, processing proceeds to step S240, which summarizes different possible alternative processing steps.

In embodiments of the present invention, further steps of setting up the videoconference (video or telephone call) are cancelled and conducting the videoconference is rejected, in view of the unsuccessful verification.

Alternative embodiments are possible, wherein the videoconference may be set up and conducted, but the second participant receives an indication about unsuccessful verification, possibly together with a ground or any other information such as a name indicated by the first participant which could not be verified. The second participant has then the opportunity to at least discuss with the first participant the further procedure.

For instance, a field of application of the present invention may be the conduct of a personal appointment of a citizen before some authority by means of a videoconference. In such appointments it is common that the citizen has to identify herself or himself by means of her or his ID card. The citizen would in this case represent the first participant and the agent of the authority the second participant.

In such a situation, when the citizen is not able to successfully verify her or his identity, certain official actions may not be allowed to be conducted by law. Nevertheless, it may be meaningful to have a conversation between both sides in order to come to an agreement how to further proceed. According to the present invention, it may therefore be an option not to completely reject the videoconference but only indicate that verification was not successful, hence indicating to the agent of the authority that certain intended official actions are prohibited.

Figure 3:
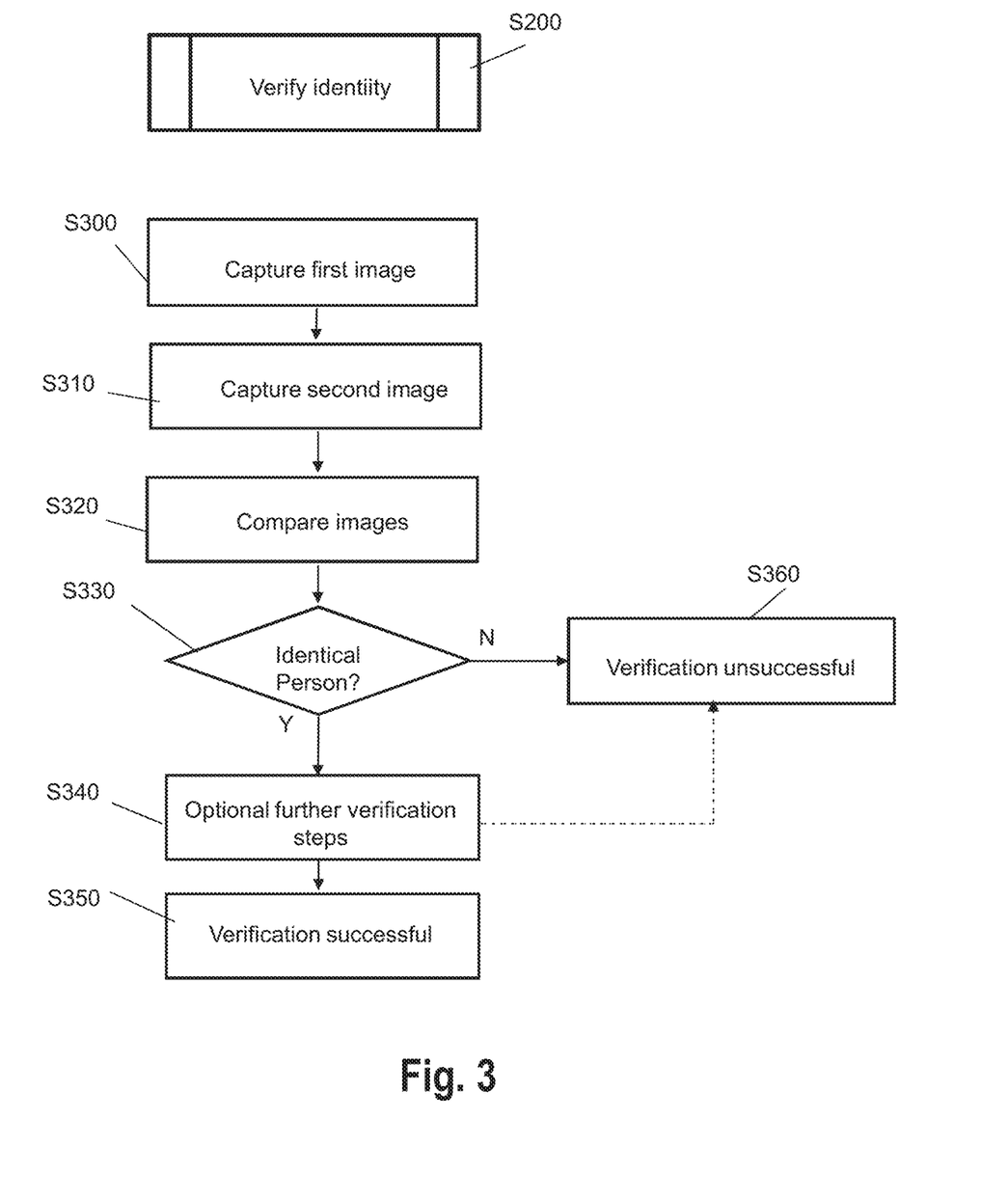
FIG. 3 is a flowchart showing details of the processing for verifying the identity of a participant (first participant) according to embodiments of the present invention.

More specifically, an exemplary processing flow of step S200 of FIG. 2 is shown in FIG. 3.

In step S300, an image of the face of the first participant is captured, as the first image. As indicated above, a series of first images (short movie) may preferably be captured instead of a single still image, in order to enhance security in identifying the essential features correctly. For this purpose, the first participant may be asked to turn his or her head left and right during capturing of the series of first images.

In step S310 an image of an official document presented by the first participant is captured, as the second image. The official document should include a photograph of the face of the person to be identified. As indicated above, a series of second images (short video sequence) may preferably be captured instead of a single still image, in order to enhance security. For this purpose, the first participant may be asked to tilt the official document during capturing of the series of second images so as to make security identifiers such as watermarks and holographic features identifiable.

The particular sequence of the above two steps is not essential for the present invention, and may also be vice versa. As a further element of security, it is also possible to capture an image where the first participant holds the official document in front of himself or herself, so as to verify the presence of the real person to be imaged, together with the document. It is also possible to capture, in addition to the image of the official document as a whole, a further specific image of the portion of the official document including the image of the holder, which will then take the role of the second image for image comparison. For this purpose, the user (first participant) has to move the image portion of the official document close to the camera, or has to use the zoom function of the camera for capturing the specific image of the face image included in the document. Further, in verifying the presence of the real person together with the document, the user may move his or her hand in front of his or her face and of the official document.

Further, and in addition to the before described, an exemplary method according to embodiments of the present invention may foresee that the user moves and/or tilts the official document in front of the camera, in order to prove the presence of specific properties of the official document such as watermarks or holographic elements.

In following step S320 the image portion of the face of the holder of the official document is extracted from the second image and compared to the face image of the real person in the first image. Respective procedures of technical image analysis are well known to a skilled person and a detailed description thereof is therefore herein omitted. In particular, for a verification, certain biometric data such as shape of and distances between predetermined features of the human face are extracted from the images and compared between the images. Such features may include the eyes, mouth and nose of the persons, without being limited to these.

Figure 4:
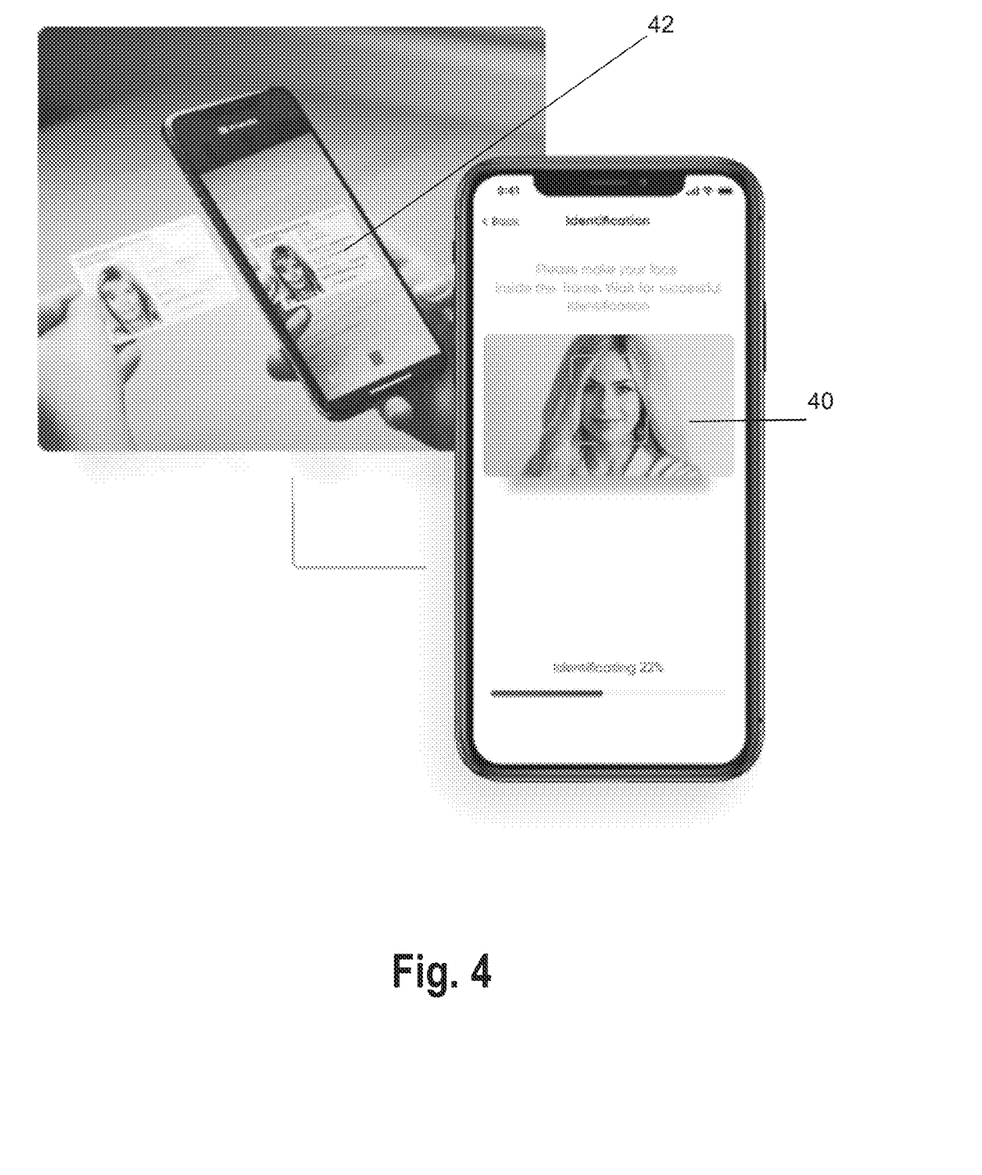
FIG. 4 illustrates, in an exemplary way, the steps for capturing images for verifying the identity, according to embodiments of the invention.

A specific illustration of the foregoing steps, in case of employing a smart phone as the terminal equipment 1 of the first participant, is given in FIG. 4. The right-hand side shows an indication of the first image 40 on the screen of smartphone 1. The left-hand side shows capturing of the second image 42 with the smartphone 1. As further symbolized by a broken rectangular shape, a predetermined portion (including mouth, nose and eyes) of the face is extracted from both images for comparison. As it is known in the art, certain unique biometric features characterizing an individual can be verified thereby.

In subsequent step S330, on the basis of the comparison result in step S320, it is judged whether both images represent the same person.

In the case when it cannot be unambiguously determined that both images show an identical person (S330: N), processing proceeds to step S360, wherein it is determined that the verification was unsuccessful. Processing then proceeds to step S240 of FIG. 2.

In the case when it was determined that both images show an identical person (S330: Y), processing proceeds to step S340 (optional) and step S350. In step S350, it is determined that the verification was successful and processing proceeds to step S220 of FIG. 2.

Optionally, after successful comparison of the two face images of the first participant in steps S320 and S330, further verification steps may be performed, which are summarized in step S340. Such additional identification steps may, for instance, include the verification of data extracted from the official document against a pre-stored database. The processing may be arranged so that a person intending to be the first participant will be verified only, if the data extracted from the official document presented match the respective data in a respective entry of the pre-stored database. The database may be included in the terminal equipment or may be included in a separate device, located at the location of the terminal device or at a remote location, such as an additional server which can be accessed over a secure connection. In particular, the database may include a list of persons who are entrusted to use verified telephone or video communication in accordance with the present invention ("trusted users"). If a person who intends to use the system was not in the list (or whose identity with a person included in the list could not be unambiguously verified), verification is considered unsuccessful and processing may further proceed to step S360, even if identity of the persons in the images was confirmed, which is indicated by the dashed line from step S340 to step S360 in the flowchart.

Also, in advance of the actual verification of the identity as described, a qualified login of the user (first participant) may be necessary in order to first verify that the first participant is an authorized user of the system. A respective user account may be linked to a database entry of a "trusted user".

The additional verification processing may further include a verification of security features of the official documents.

Other additional verification steps may optionally be included in step S340. This may include also procedures known to a skilled person as "Artificial Intelligence (AI)".

It is noted that the steps for verifying the identity, i.e., in particular steps S320, S330 and S340, may be performed by means of respective software directly in the terminal equipment used by the first participant. Alternatively, these verification steps may be performed at a remote location, such as by a specific server having a trusted secure connection with the terminal equipment 1 of the first participant.

The verification as illustrated in FIG. 3 may be repeated during a videoconference, by extracting a first image directly from the video image of the first participant and repeatedly comparing same with the second image. Thereby, it can be ensured that the person acting as the first participant has not changed after an initial verification of the identity.

Alternatively, or at the same time, this can be ensured when the verified identity data includes the document image of the person or the complete second image, i.e. the complete image of the official document.

Figure 5:
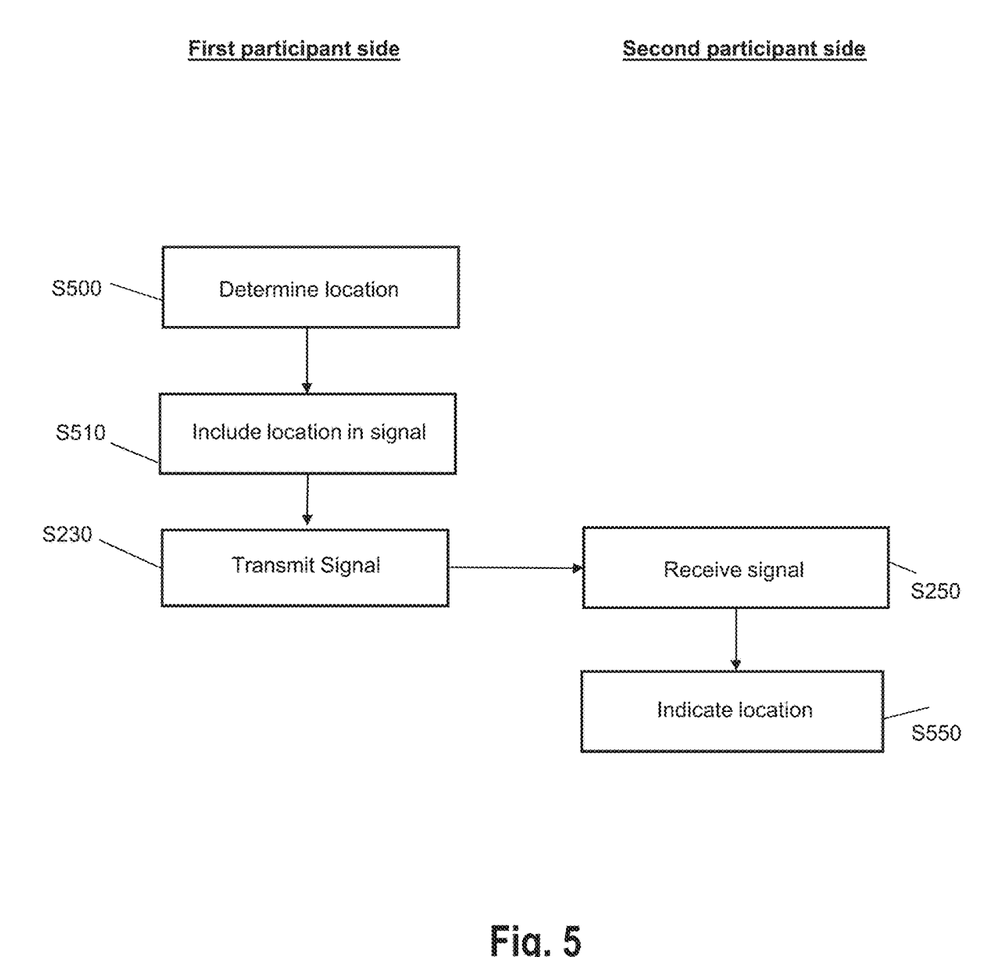
FIG. 5 is a flowchart illustrating the steps for determining and indicating the location of a participant to another participant, according to embodiments of the present invention.

A further particular optional aspect of the present invention is illustrated in FIG. 5.

In the framework of the present invention, it may be meaningful to not only verify the identity of a communication partner (first participant) but also the current location of the first participant. For instance, in certain circumstances, authorities may prohibit a person to leave a certain place or area during a certain period of time, for which reason the person is obliged to visit the respective authority regularly. In the framework of the present invention, such a personal attendance of the authority by the citizen underlying the obligation may be replaced with a videoconference as well, when the true location of the citizen (first participant) can be verified during the videoconference, in order to guarantee that the respective person did indeed not leave the allowed place or area. For this purpose, in addition to the verification of the identity, the location of the first participant (more specifically: the location of the terminal equipment used by the first participant to verify himself or herself and to conduct the videoconference) is determined and verified in step S500. For instance, the terminal equipment itself may be equipped with a means for determining a location, such as by a satellite navigation system (GPS or others). A respective equipment is, for instance, common to smartphones, which may be used as the terminal equipment. A person skilled in the art is aware of other technical means to verifiably determine the location of the person and/or equipment used by the person. This may be based, for instance, on a usage of a particular cell of a cellular phone network, or an IP address which may be associated with a certain region. In principle, even further possibilities exist for verifying the location, which may be used in the framework of the present invention. For instance, an image of the person may be captured in real-time (in addition to the images captured for the identity verification), showing the intended first participant in front of some landmark such as a building which is known to the second participant as existing at the location to be verified and being immobile.

In subsequent step S510, location information verified in step S500 is included in the signal to be transmitted to the site of the second participant. In particular, this information is included in the same signal including the verified identity data of the first participant, as an additional data item. Alternatively, it is possible that the location information is included in a different signal to be transmitted separately.

In the following, the signal is transmitted to the side (terminal equipment) of the second participant. In the given example, indicating step number S230 that is identical to the respective step in FIG. 2, it is assumed that the location information is included in the same signal as the verified identity information (optional).

After having been received by the terminal equipment of the second participant in step S250, the location information is indicated to the second participant in step S550. This may be made together with the verified identity information, as an additional data item, or separately.

Figure 6:
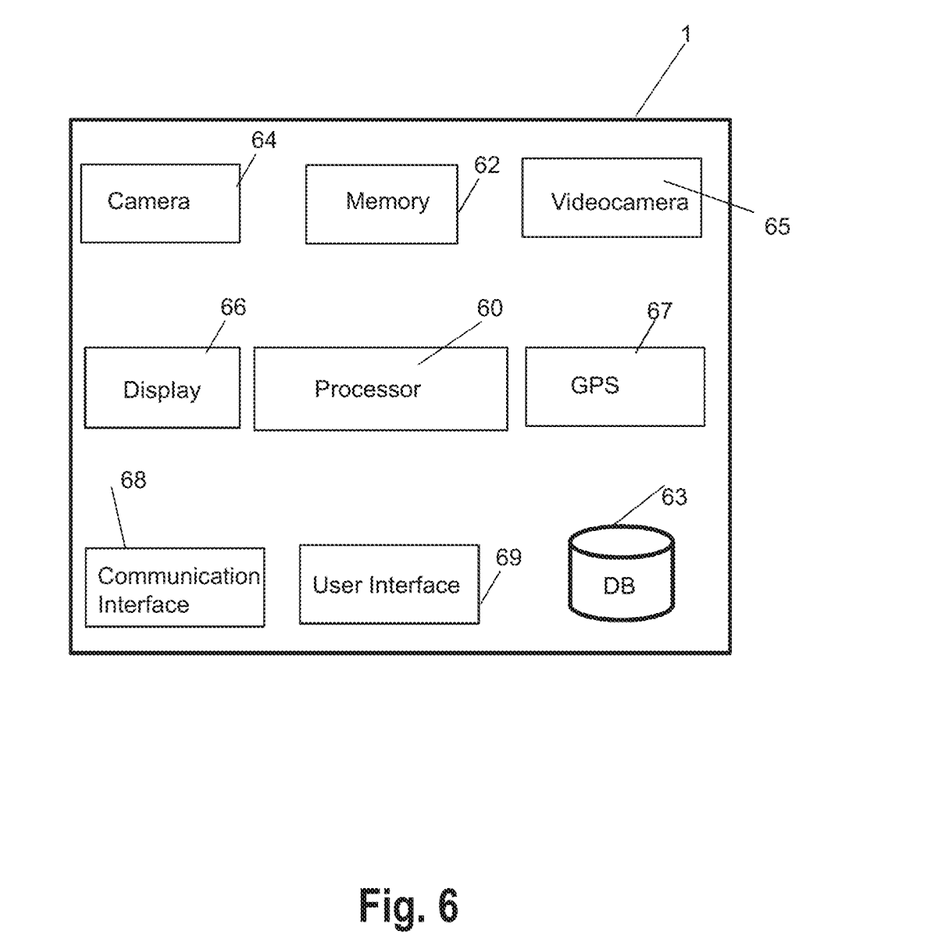
FIG. 6 is a block diagram for illustrating terminal equipment to be used as terminal equipment of a first and/or second participant of the video or telephone call according to embodiments of the present invention.

FIG. 6 is a block scheme illustrating an exemplary hardware structure of a device that can be used as terminal equipment for the first participant and/or the second participant.

In the illustrated example, terminal equipment 1 includes a processor (processing unit) 60, and a memory 62. The processor is appropriately programmed to perform all method steps to be performed by the terminal equipment 1 of the first or second participant, respectively.

Memory 62 includes, in particular, an operation memory operatively coupled with a processor and may include further kinds of memory such as non-volatile memory, including hard disk memory or detachably connected memory devices such as CD-ROM, DVD-ROM, BD-ROM, and others a skilled person is aware of. As a specific part of a memory (storage), FIG. 6 additionally illustrates a database (DB) 63, which may, in particular, include the above-mentioned pre-stored database having additional entries for verifying the identity. As indicated, such a database may alternatively be located at a remote or local server.

Terminal equipment 1 further includes at least one camera 64. As described above, optionally (not shown) several cameras may be provided, for instance, different cameras for capturing the first and the second image to be used for the verification. Separately, video camera 65 is shown. In embodiments of the present invention, there may be a single camera capable of both capturing still and video images, which is used for capturing the first and second images and subsequently used as a video camera for conducting the videoconference. Alternatively, video camera 65 may be used for capturing the first image only, whereas the second image is captured by a different camera. Capturing the first image with the video camera is particularly advantageous for a (repeated) verification during a videoconference, because this ensures that the person (first participant) shown in the video screen is indeed the same whose identity is verified.

Terminal equipment 1 further includes a display 66, a GPS receiver 67, a communication interface 68, and a user interface 69 for operating the determining device by a user.

The individual elements are appropriately interconnected, as a skilled person will understand, by means of a bus system or other suitable connections (not shown for simplification).

Some of the indicated elements of this hardware structure are optional, and it is sufficient that the terminal equipment includes only those elements which are indispensable to perform all necessary functions. For instance, a GPS receiver 67 may not be necessary in a terminal device 1 of a second participant the location of whom does not need to be verified. Even a terminal equipment 1 of the first participant may be used without having a GPS receiver 67, if the optional step of verifying the location is not necessary to be performed. No video camera may be present in case of using the present invention for conducting a verified speech call (telephone call).

On the other hand, at least some of the indicated items are not limited to being present only once and further items not shown here may be included in the terminal equipment. For instance, there may be several (wireless or wired) communication interfaces, in compliance with different technologies of standards (such as LAN, WLAN, cellular networks). Also, the shown elements of terminal equipment 1 may be included in a single device or may be distributed over several devices established at the site of the first participant or the second participant, respectively. In case of bi-directional verification and/or location, of course, similar terminal equipment is necessary to be used on both sites.

FIG. 7 is an exemplary illustration of a terminal device 1 used by a second participant, wherein verified identity information of the first participant is displayed.

Specifically, the drawing shows a computer having a display screen 70. On the display screen, on which a video image of a communication partner (first participant) may be shown during the videoconference (not illustrated), there is an additional window 72 (pop-up window, aka picture-in-picture) wherein the verified identity information of the first participant is shown to the second participant. This is schematically illustrated herein by means of plural lines symbolizing text, but the embodiment is not limited to this. In addition, further information may be indicated such as a photograph of the communication partner (first image of face image extracted from the second image), or the whole second image, i.e. an image of the official document of the first participant, may be indicated, for example. In particular, when an image of the communication partner is included in the verified data, this image may be thus provided to the second participant before the actual videoconference starts, wherein the video image of the second participant will be anyway available. Alternatively, in the framework of the verified identification data, an image may even be included and provided to the second participant in case of a speech call to which the concept of the present invention is applied.

The present invention is not limited to the embodiments illustrated and detailed above but defined by the appended claims. Various modifications within the scope of the appended claims are possible.

In particular, all processing steps of the above embodiments and as defined in the claims are not limited to being performed uni-directionally only so that the first participant identifies himself or herself to a second participant. While uni-directional identification may be sufficient and even preferable, for instance in conducting videoconferences with state authorities, wherein normally only a first person (visitor) identifies himself or herself to another person (agent) even if the meeting is conducted in person, in other aspects such as use of the invention in the framework of business negotiations, financial transactions, bi-directional identity verification may be desired and is possible in the framework of the present invention. Hence, the present invention allows to perform mutual identification, so that the second participant verifies his or her identity to the first participant in exactly the same manner as the first participant verifies his or her identity to the second participant.

It is further worth noticing that the present invention is not limited to bi-directional communication only, wherein there are only two participants, i.e. the first participant and second participant. The present invention is applicable to an arbitrary number of participants of a videoconference. In this case, there are various possibilities, how the videoconference may be conducted. It is only necessary that at least one of the participants, acting as a "first participant" in the sense of the present disclosure, verifies his or her identity to at least one other participant, acting as a "second participant" in the sense of the present disclosure. However, it is needless to say that the present invention allows for a variety of additional configurations. For instance, one of the participants, acting as a first participant, may identify himself or herself to all other participants. Further, a mutual verification of the identity of all participants to each other would be within the framework of the present invention. Generally, it is within the scope of the present invention that any member of a group of an arbitrary number of participants identifies himself or herself to any member of another (or the same) group of an arbitrary number of participants.

In summary, the present invention relates to a method for conducting a videoconference including a certified verification of at least one communication partner (first participant). Thus, another communication partner (second participant) is provided with legal certainty that the person whom he or she talks to is indeed the person she says she is. For this purpose, on the side of the first participant a technical verification step is performed in advance of setting up the video call, which is based at least on a comparison of an image of the first participant captured in real-time and an image available on an official document such as an ID card of the first participant. In case of success, respective verified identification information of the first participant is transmitted to the terminal equipment of the second participant and indicated to the second participant. Optionally, the method may further include determining and verifying the location of the first participant. In embodiments, the method may be applied bi-directionally so as to allow for mutual identification of at least two participants with respect to each other. If the verification step was unsuccessful, the videoconference may either be rejected or may be conducted with a respective indication that the identity of the communication partner could not be verified.

The invention claimed is:

1. A method of conducting a video or telephone call between at least two participants, the method comprising:
   verifying the identity of a first participant; and
   after successful verification of the identity of the first participant, providing information indicating the verified identity of the first participant to a second participant before and during the video or telephone call;
   wherein said step of verifying the identity of the first participant comprises:
   capturing a face image of the first participant, as a first image;
   capturing an image of an official document identifying the first participant, as a second image, the official document including a face image of the first participant together with further data identifying the first participant, wherein the two images are captured immediately before the setup of the video or telephone call; and
   verifying the identity at least by comparing the first image with the face image included in the second image, by means of technical image analysis, and
   wherein said step of providing information comprises:
   generating a signal including verified data identifying the first participant on the basis of data extracted from the second image;
   transmitting said signal to the site of the second participant; and
   displaying said verified data identifying the first participant on a terminal device of the second participant used for conducting the video or telephone call,
   wherein said verified data included in said signal transmitted to the second participant and displayed on the display of the terminal equipment of the second participant includes the name of the first participant and further information that has been extracted from the official document.

2. The method according to claim 1, wherein there is captured a series of first images and/or a series of second images, the individual images of the series of first images differing from each other by different orientations of the face of the first participant, the individual images of the series of second images differing from each other by a different tilt of the official document.

3. The method according to claim 1, for conducting a video call, wherein said step of verifying the identity of a first participant is repeated during the course of the videoconference, wherein an updated signal including updated verified identity data is generated and transmitted to the second participant upon successful repetition of the verification, and wherein for the repeated verification the first image is extracted from the video image transmitted to the second participant.

4. The method according to claim 1, wherein said verifying step further comprises the step of comparing data extracted from the official document captured in the second image with data pre-stored in a database.

5. The method according to claim 1, further comprising:
   determining a location of the first participant,
   transmitting location information of the first participant to the site of the second participant, and
   indicating said location information to the second participant.

6. The method according to claim 1, wherein, after successful verification, said second image is completely included in the signal transmitted and displayed to the second participant.

7. The method according to claim 1, wherein said verified data identifying the first participant and transmitted in said signal to the second participant are indicated to the second participant before setup of the video or telephone call is completed.

8. The method according to claim 7, wherein said second participant is invited to confirm call setup completion after having been provided with the verified data.

9. The method according to claim 1, wherein said verified data remain available to the second participant after the end of the video or telephone call.

10. The method according to claim 1, for conducting a video call, wherein said verified data are displayed in a dedicated portion of the screen used for the video call.

11. The method according to claim 1, further comprising rejecting setup of said video or telephone call when said step of verifying the identity of the first participant was not successful.

12. The method according to claim 1, wherein
setup of the video or telephone call is completed even if said step of verifying the identity of the first participant was not successful, the method further comprising:

transmitting and providing an indication that the verification of the identity of the first participant was not successful to the second participant.

13. The method according to claim 1, operating in a bi-directional manner so that the identity of said second participant is verified and respective information indicating the verified identity of the second participant to the first participant is provided to the first participant.

14. A system for conducting a video or telephone call between at least two participants, the system comprising:

terminal equipment of a first participant and terminal equipment of a second participant, wherein the system comprises equipment for verifying the identity of the first participant; and the system being further adapted to provide information indicating the verified identity of the first participant to the second participant before and during the video or telephone call, after successful verification of the identity of the first participant;

wherein said equipment for verifying the identity of the first participant comprises:

a first camera for capturing, immediately before setup of a video or telephone call, a face image of the first participant, as a first image;

a second camera for capturing, immediately before the setup of the video or telephone call, an image of an official document identifying the first participant, as a second image, the official document including a face image of the first participant together with further data identifying the first participant;

a processor for comparing the first image with the face image included in the second image, by means of technical image analysis, and a signal generator for generating a signal including verified data identifying the first participant on the basis of data extracted from the second image;

wherein said terminal equipment of the first participant comprises a transmitter for transmitting said signal to the terminal equipment of the second participant;

wherein said terminal equipment of the second participant comprises a display for displaying said verified data identifying the first participant, and wherein said verified data included in said signal transmitted to the second participant and displayed on the display of the terminal equipment of the second participant includes the name of the first participant and further information that has been extracted from the official document.

\* \* \* \* \*